(12) United States Patent
Walters et al.

(10) Patent No.: US 11,966,431 B2
(45) Date of Patent: Apr. 23, 2024

(54) SEARCH ENGINE FOR A MESH NETWORK BASED ON A BLOCKCHAIN

(71) Applicant: Capital One Services, LLC, McLean, VA (US)

(72) Inventors: Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 321 days.

(21) Appl. No.: 17/466,451

(22) Filed: Sep. 3, 2021

(65) Prior Publication Data
US 2023/0070256 A1   Mar. 9, 2023

(51) Int. Cl.
G06F 16/27         (2019.01)
G06F 16/2457       (2019.01)
G06F 16/43         (2019.01)

(52) U.S. Cl.
CPC ........ *G06F 16/43* (2019.01); *G06F 16/24578* (2019.01); *G06F 16/27* (2019.01)

(58) Field of Classification Search
CPC .......................... G06F 16/24578; G06F 16/27
See application file for complete search history.

(56) References Cited

U.S. PATENT DOCUMENTS

| | | | |
|---|---|---|---|
| 2020/0059353 A1* | 2/2020 | Liu | H04L 67/1021 |
| 2020/0104258 A1* | 4/2020 | Purushotham | G06F 12/121 |
| 2020/0104428 A1* | 4/2020 | Bier | H04L 9/3239 |
| 2020/0151710 A1* | 5/2020 | Walters | G06Q 20/3825 |
| 2020/0311790 A1 | 10/2020 | Keren | |
| 2020/0322800 A1 | 10/2020 | Ozanian | |
| 2020/0366505 A1* | 11/2020 | Feng | H04L 9/3239 |
| 2020/0372014 A1 | 11/2020 | Boshmaf et al. | |
| 2020/0387967 A1 | 12/2020 | Cella | |
| 2021/0065045 A1 | 3/2021 | Kummamuru et al. | |
| 2021/0286900 A1* | 9/2021 | Li | G06F 21/602 |

* cited by examiner

*Primary Examiner* — Grace Park
(74) *Attorney, Agent, or Firm* — Banner & Witcoff, Ltd.

(57) ABSTRACT

Systems as described herein may determine a plurality of content items posted to a mesh network and each content item may be associated with a signature stored in a blockchain. A search engine may query each content item based on the corresponding signature in the blockchain. The search engine may parse each content item to obtain a label and store the label, the signature and content associated with each content item in a database. The search engine may query the blockchain to obtain a frequency that each content item has been queried in a predetermined period of time. The search engine may rank the content items based on the frequencies, and determine a subset of the content items as frequently searched content. Accordingly, the search engine may distribute the frequently searched content to a plurality of cached nodes in the mesh network.

20 Claims, 5 Drawing Sheets

SEARCH ENGINE FOR A MESH NETWORK BASED ON A BLOCKCHAIN

FIELD OF USE

Aspects of the disclosure relate generally to data processing and more specifically to the processing and management of data in distributed systems.

BACKGROUND

A computer device may attempt to retrieve certain content via a mesh network. The Internet access may be limited in certain locations of the network. The cost associated with the transaction may grow with the number of the nodes involved in the transaction. As the mesh network expands dynamically, it may be increasingly costly to conduct such transactions. As a result, conventional mesh networks may fail to provide an optimal mechanism to post, store and retrieve content.

Aspects described herein may address these and other problems, and generally improve the quality, efficiency, and speed of processing data to implement an effective search mechanism to facilitate content retrievals in a mesh network.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for implementing a search engine for a mesh network based on a blockchain. The search engine may determine a plurality of content items posted to a mesh network, and each content item may be associated with a signature stored in a blockchain. The search engine may query each content item based on the corresponding signature in the blockchain and parse the content item to obtain a label and content associated with the content item. For example, the label may correspond to one or more word vectors including searchable text describing the content item. The label, the signature, and the content associated with each content item may be stored in a database. The blockchain may be queried to obtain a frequency that each content item has been queried in a predetermined period of time (e.g. 24 hours). The content items may be ranked based on the frequencies and a subset of content items may be determined as frequently searched content based on the ranking. Subsequently, the frequently searched content may be distributed to a plurality of cached nodes in the mesh network for further storage and quick retrieval.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced.

It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for a search engine for a mesh network based on a blockchain. The search engine may receive a request for a content item from a computing device (e.g. a requesting device). The search engine may determine that the content item is frequently searched content. The search engine may retrieve the content from one of the plurality of cached nodes based on the label. One of the plurality of cached nodes may be selected on the basis that the cached node is proximately located to the computing device. The search engine may send the retrieved content item to the computing device. Alternatively, the search engine may determine that the content item is not frequently searched content. The search engine may retrieve the content item from an original hosting node in the mesh network and send the retrieved content item to the computing device.

In many aspects, the search engine may receive a request to access a content item and determine that the content item is the frequently searched content. The search engine may send the signature associated with the content item and a path to the one of the plurality of cached nodes that is proximately located to the computing device. The search engine may determine a last access time of a particular content item has exceeded an expiration time and delete the particular content item from the plurality of cached nodes.

The search engine as described herein allows for storing a cryptocurrency wallet associated with the server system in the database. The database may include a database from a local storage of the server system. The database may include a distributed database shared among the plurality of the cached nodes in the mesh network.

An Example Mesh Network

Figure 1:
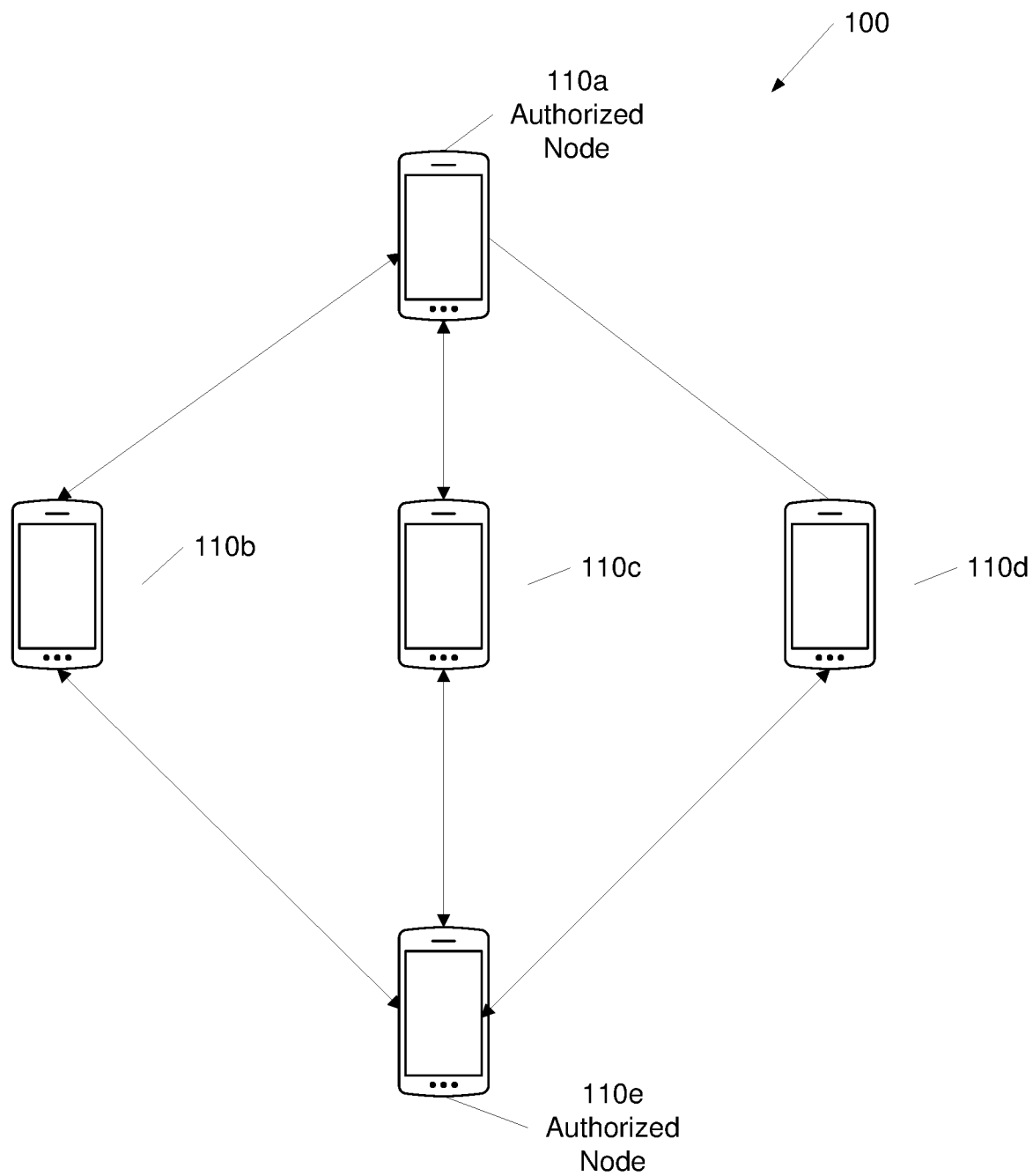
FIG. 1 shows an example mesh network in which one or more aspects described herein may be implemented.

FIG. 1 shows an example mesh network 100. The mesh network 100 may include a first node 110a, a second node 110b, a third node 110c, a fourth node 110d, and a fifth node 110e (collectively, "nodes 110"). The mesh network 100 is not limited to the number of nodes depicted in FIG. 1. Any of the devices and systems described herein may be implemented, in whole or in part, using one or more computing devices described with respect to FIG. 2.

Mesh network 100 may have a local network topology in which nodes 110 and bridges, switches, and other infrastructure devices may connect directly, dynamically and non-hierarchically to as many other nodes as possible and cooperate with one another to route data from/to clients. This lack of dependency on one node may allow for every node to participate in the relay of information. Mesh network 100 may dynamically self-organize and self-configure, which may reduce installation overhead. The ability to self-configure enables dynamic distribution of workloads, particularly in the event that a few nodes should fail, may contribute to fault-tolerance and reduced maintenance costs. Mesh network 100 may be any type of mesh network that may operate according to any known mesh networking protocol or standard. In various embodiments, data, traffic, messages, or other communications within mesh network 100 can be transmitted between nodes 110.

Mesh network 100 can include one or more nodes 110 that may host content. The content can be any type of file such as, for example, a file related to a website, a video file, an audio file, an image file, a multimedia file, or any type of file that may be provided to any other node 110. In some examples, any node 110 may be permitted to host content. In other examples, only certain nodes 110, for example, authorized nodes or registered nodes 110a and 110e may host content. In some examples, any node 110 may be permitted to search for and request hosted content. In other examples, only certain nodes 110, for example, authorized nodes or registered nodes 110a and 110e may search for and request hosted content.

In a variety of embodiments, data, traffic, messages, or other communications within mesh network 100 may be originated from or be intended to be received by certain nodes 110, for example, authorized nodes or registered nodes 110a and 110e. Non-authorized or non-registered nodes 110b, 110c and 110d may funnel data, traffic, messages, or other communications within mesh network 100 to authorized or registered nodes 101a and 110e. Data, traffic, messages, or other communications within mesh network 100 may be transmitted from an initial node to a recipient node through one or more intermediate nodes.

In a variety of embodiments, one or more nodes 110 may maintain a blockchain that may be used to route to hosted content. For example, the blockchain may include records or blocks indicating what content is hosted within mesh network 100 and which nodes 110 may host the content, a copy of the content, and/or a cached version of the content. The blockchain may also provide indications of a version of the hosted content and an authenticity of the hosted content. Nodes 110 may search the blockchain for the particular content and may determine which node 110 to interact with to receive the content. A node 110 may have another node conduct the search on its behalf (e.g., node 110a or 110e that maintains the blockchain). Node 110 may provide a payment to the node hosting the content in order to receive the content. Node 110 may provide a payment to any intermediate node that helps to transfer the hosted content from the hosting node to node 110 that requests he content.

Computing Devices

Figure 2:
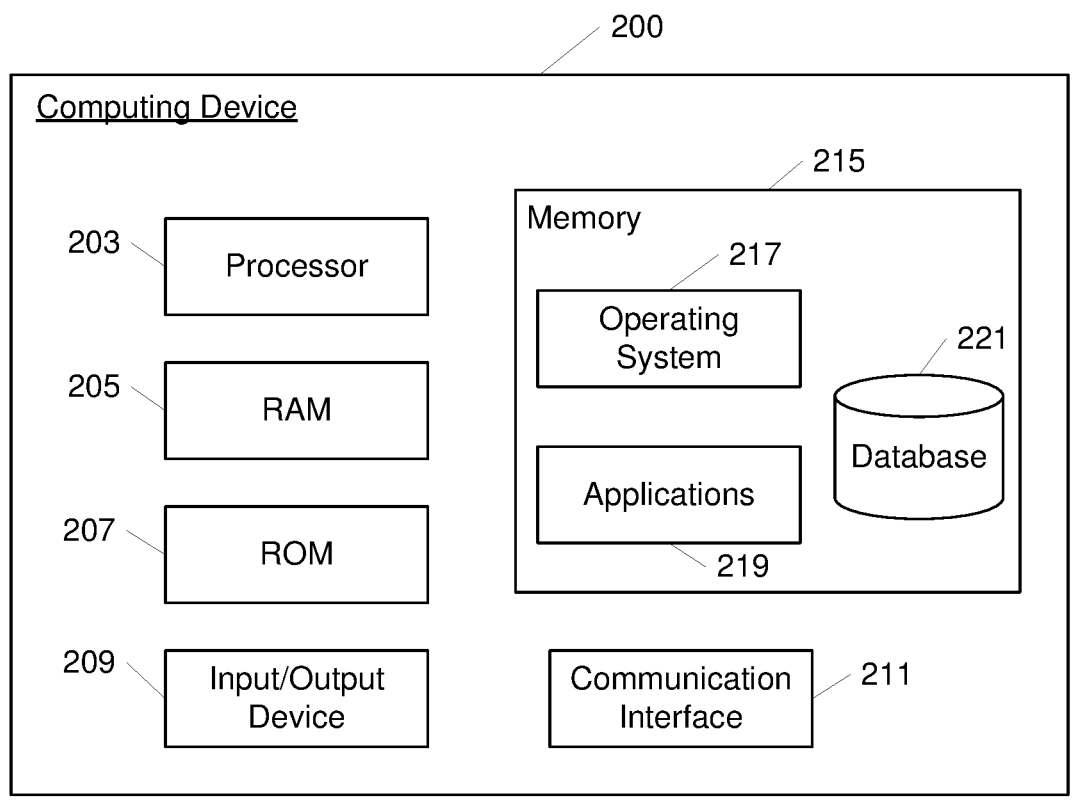
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Example System for Implementing a Search Engine Based on a Blockchain

Figure 3:
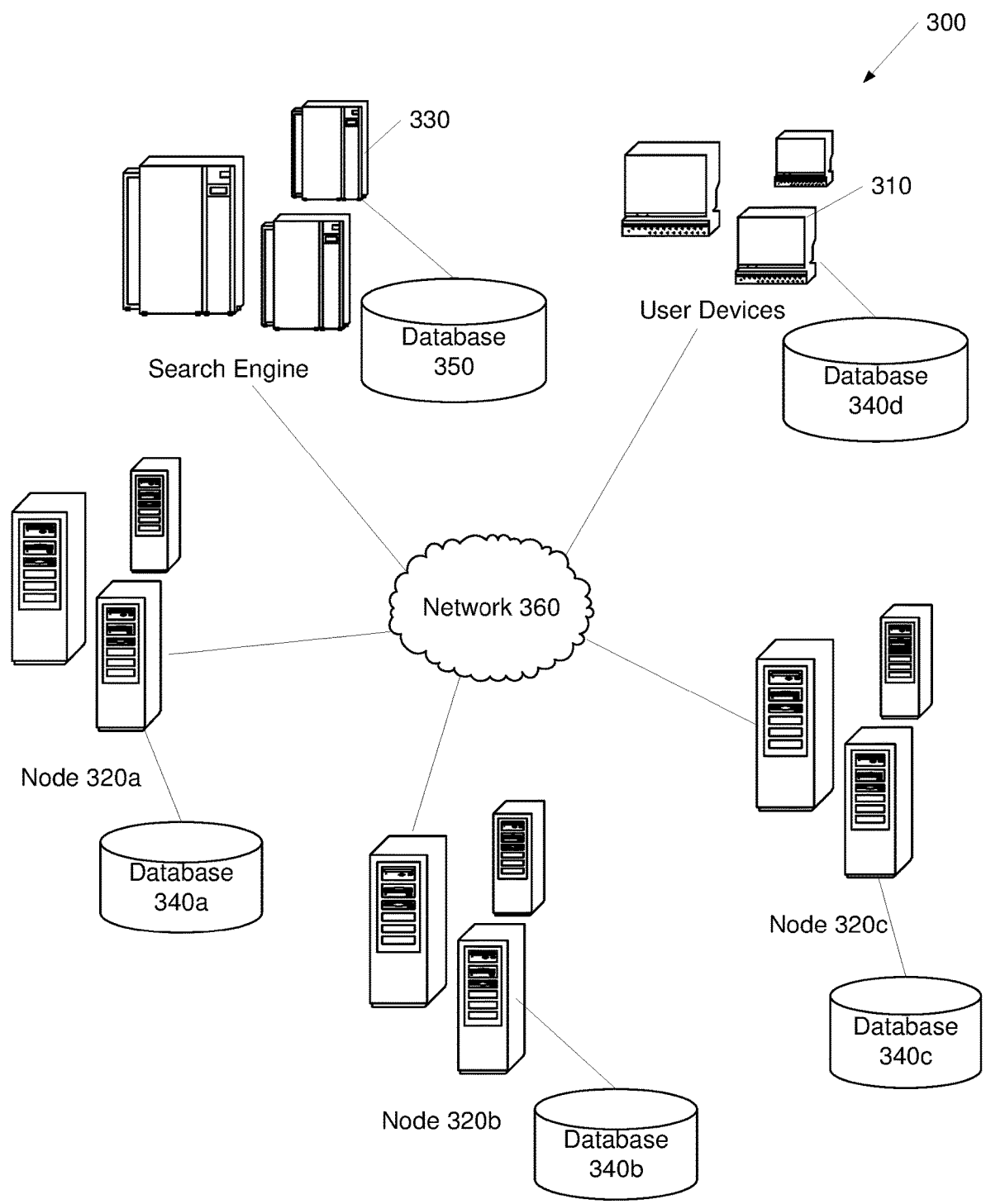
FIG. 3 shows an example of a system for implementing a search engine for a mesh network based on a blockchain in which one or more aspects described herein may be implemented.

System 300 may include one or more user devices 310, one or more nodes 320a-c, at least one search engine 330, at least one database 340a-c, and/or database 350 in communication via a network 360. In some examples, user devices 310, nodes 320a-c, and search engine 330 may be nodes in a mesh networks, similar to nodes 110 in FIG. 1. System 300 may not be limited to the number of nodes depicted in FIG. 3. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

User devices 310 may send a request to join the mesh network in system 100. After establishing as nodes operable in the mesh network, user devices 310 may request and receive content items from the mesh network. The content items may include data, traffic, messages, and/or any other communications within the mesh network that may be transmitted between nodes (e.g., user devices 310, nodes 320a-c, and search engine 330) in the mesh network as described herein. Similar to those in FIG. 1, the content items transmitted in system 300 may be any type of files such as files related to a website, a video file, an audio file, a text file, an image file, and/or a multimedia file. User devices 310 may host the content items in mesh network. For example, user devices 310 may store the content items in a storage device such as database 340d.

User devices 310 may post the content item to the mesh network. For example, user devices 310 may host the content item in its storage device and post a piece of content item as a searchable transaction on a blockchain with a signature of the content item added to the blockchain for recordkeeping. The signature may indicate information such as the type of content item, the host of the content item, and/or a version number associated with the content item. The signature may also include additional metadata of the content item, such as a type of the content item, a type of the file storing the content item, a description of the content item etc. In a variety of embodiments, the signature may be encrypted using the encryption keys (e.g., public keys) associated with user devices 310 conducting the transaction for the content item or hosting the content item. In a variety of embodiments, the signatures may be decrypted using keys (e.g., private keys) associated with the receiving node in the mesh network. The signature may be stored in the storage device such database 340d.

In a variety of embodiments, user devices 310 may generate one or more cryptocurrency wallets that may be loaded with certain amount of cryptocurrency tokens. The cryptocurrency wallets may be stored in a memory unit of user devices 310 or in the storage device such as database 340d. User devices 310 may receive cryptocurrency tokens from other nodes in the mesh network for hosting and providing the content item. User devices 310 may make payment to other nodes in the mesh network in exchange for retrieving other hosted content from them.

User devices 310 may be any device that belongs to a user conducting transactions with the mesh network using the blockchain. For example, a user may pass messages related to content sharing or may conduct a financial transaction that may be facilitated with the mesh network. User devices 310 may include computing devices, such as laptop computers, desktop computers, mobile devices, smart phones, tablets, and the like. According to some examples, user devices 310 may include hardware and software that allow them to connect directly to network 360. Alternatively, user devices 310 may connect to a local device, such as a personal computer, server, or other computing device, which connects to network 360.

System 300 may include one or more nodes 320a-c and data, traffic, messages, or other communications within the mesh network may be transmitted between nodes 302a-c in the mesh network. For example, the content item may be transmitted from an initial node to a desired recipient node through one or more intermediate nodes. In some examples, certain nodes in the mesh network may be authorized nodes that may maintain a blockchain. The authorized nodes may host content items in the mesh network. The authorized nodes may post content as a searchable transaction on the blockchain. Certain nodes in the mesh network may be unauthorized modes. The unauthorized nodes may route communications or other messages to an authorized node, but cannot directly send messages to another unauthorized node.

A communication path may be established between a requesting node and a destination node in the mesh network. The communication path may include one or more intermediate nodes between the requesting node and the destination node. For example, the communication path may be allowed between authorized nodes, or between an authorized node and an unauthorized node, but may not allow between two unauthorized nodes.

Nodes 320a-c may be associated with storage devices such as databases 340a-c. For example, node 320a may be associated with database 340a, node 320b may be associated with database 340b, and node 320c may be associated with database 340c. Databases 340a-c may be a database local to the corresponding node. Databases 340a-c may be a distributed database shared among nodes 320a-c. Nodes 320a-c may cache or store content items in databases 340a-c. Nodes 320a-c may store signatures of the content items or the cryptocurrency wallets associated with nodes 320a-c in databases 340a-c.

Search engine 330 may determine the content items posted to a mesh network. The authorized nodes (e.g. search engine 330) in the mesh network may maintain a blockchain and search engine 330 may make the determination when the content items are posted to the blockchain as searchable transactions by user devices 310 or other nodes in the network. In a variety of embodiments, user devices 310 and/or search engine 330 may correspond to the nodes in the mesh network. In some examples, search node 330 may be an authorized node. Search engine 330 may query a content item in the mesh network based on the signature that identifies the content item. Search engine 330 may parse the content item to obtain a label and the content. For example, the label may be a word vector that includes searchable text describing the content item. Search engine 330 may store the label, the signature and the content associated with the content item in database 350. Database 350 may be a storage device local to search engine 330. Database 350 may also be a distributed database shared among the nodes of the mesh network.

Search engine 330 may query the blockchain to obtain a frequency that each content item has been queried in a predetermined period of time (e.g. for a day, a week, or a month). Search engine 330 may rank the content items based on the frequencies. Search engine 330 may determine a subset of the content items as frequently searched content based on the ranking. Search engine 330 may distribute the frequently searched content to a plurality of cached nodes in the mesh network.

Search engine 330 may receive a request from a requesting device (e.g. user devices 110) a request for a content item. Search engine 330 may determine that the content item is the frequently searched item and retrieve the content item from one of the plurality of cached nodes that is proximately located to the computing device. Search engine 330 may send the signature associated with the content item and a path to the cached node. Search engine 330 may determine that the content item is not the frequently searched content and retrieve the content item from an original hosting node in the mesh network. Search engine 330 may send the retrieved content item to the computing device and receive a payment from the computing device. Search engine 330 may store the payment in a cryptocurrency wallet associated with database 350.

Network 360 may be any type of mesh network and may operate according to any known mesh networking protocol or standard. System 300 may be provided in an area without Internet access or with limited Internet access such as, for example, on a cruise ship, in a farmer's market or a festival. The mesh network may provide a payment system within the mesh network that may not require each node of the mesh network to be connected directly to the Internet. In a variety of embodiments, one or more nodes may maintain a blockchain for a cryptocurrency that may support a payment system useable within the mesh network and that may support secure communications within the mesh network.

User devices 310, nodes 320a-c, search engine 330, databases 340a-c, and/or database 350 may be associated with a particular authentication session. Search engine 330 may receive, process, and/or store a variety of content items, signatures, labels, cryptocurrency, and/or receive content items with nodes 320a-c as described herein. However, it should be noted that any device in system 300 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 170 may include a local area network (LAN), a wide area network (WAN), a wireless telecommunications network, and/or any other communication network or combination thereof.

The data transferred to and from various computing devices in system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 300 in front of one or more computing devices such that any external devices may communicate directly with the specialized hardware.

Example Method for Implementing a Search Engine Based on a Blockchain

The search engine may organize and track content items in a mesh network using a blockchain. The search engine may identify frequently searched content and distribute the content to cached nodes in the mesh network for quick access. Upon receiving a request for a piece of content item, the search engine may determine a path to a cached node that is proximately located to a requesting device. In return, the search engine may receive a payment in the form of the cryptocurrency tokens for providing the content.

Figure 4:
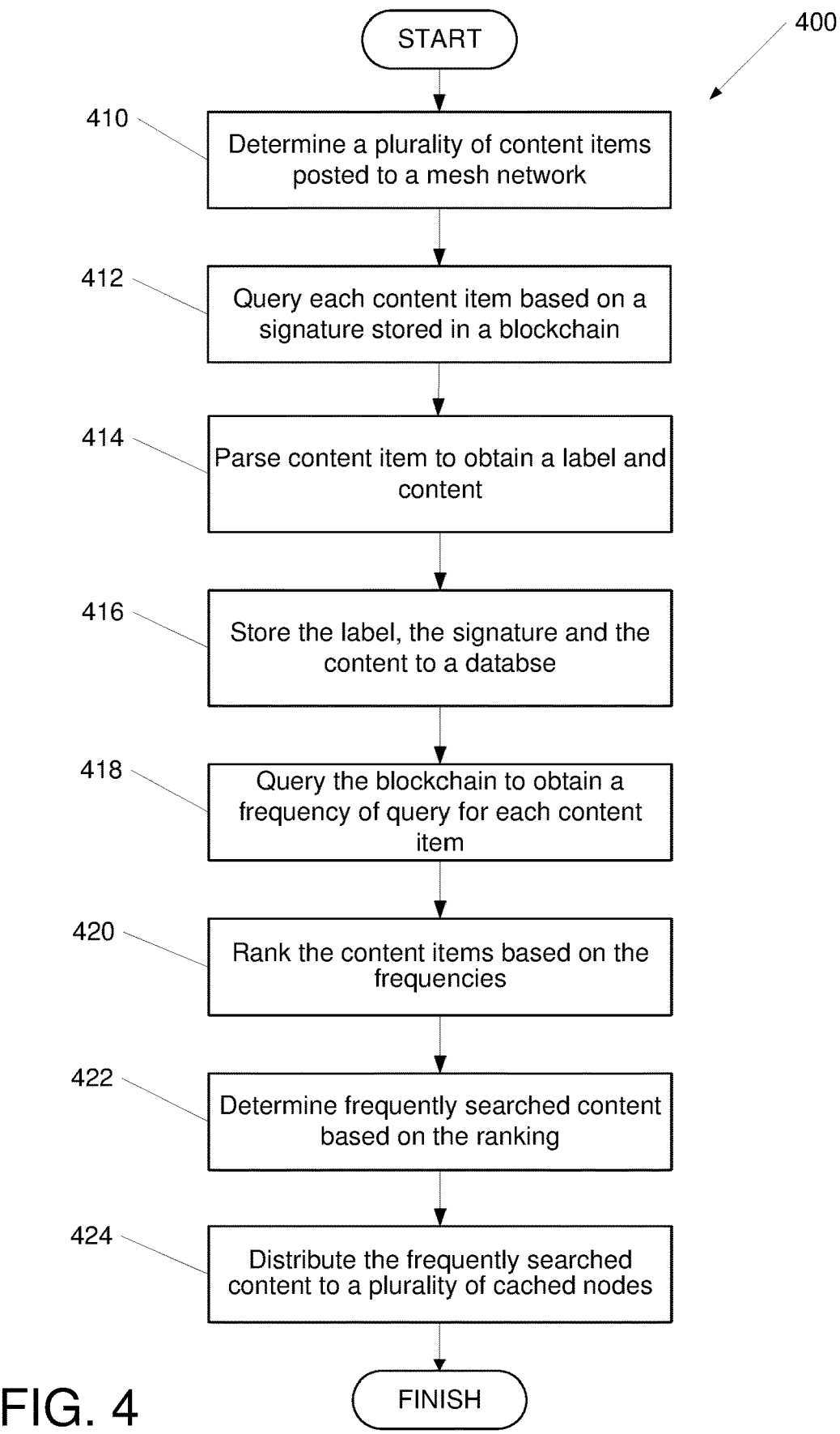
FIG. 4 shows a flow chart of a process for implementing a search engine for a mesh network based on a blockchain according to one or more aspects of the disclosure.

FIG. 4 shows a flow chart of a process for implementing a search engine for a mesh network based on a blockchain according to one or more aspects of the disclosure. Some or all of the steps of process 400 may be performed using one or more computing devices as described herein. In a variety of embodiments, some or all of the steps described below may be combined and/or divided into sub-steps as appropriate.

At step 410, a search engine may determine a plurality of content items posted to a mesh network. The mesh network may maintain a blockchain. The blockchain may include a list of records or blocks that may grow dynamically and the records may be linked using cryptography. Each block may contain a cryptographic hash of the previous block, a timestamp, and/or transaction data. The blockchain may be a distributed ledger that may record transactions between two nodes of the mesh network in a verifiable way. The transactions may include, for example, content sharing or a financial transaction related to a purchase of goods or services. The content items or transactions may be related to any type of files such as files related to a website, a video file, an audio file, a text file, an image file, and/or a multimedia file. The blockchain may be managed by a peer-to-peer network collectively adhering to a protocol for inter-node communication and validating new blocks. The mesh network may be provided in an area without Internet access or with limited Internet access such as on a cruise ship, in a farmer's market or a festival. In some examples, the search engine may correspond to an authorized node in the mesh network that may maintain the blockchain. The search engine may be a computing device external to the mesh network. For example, a user may be on a cruise ship using a user device operating as a node of the mesh network. The user may post a content item (e.g. a video file of a tropical island) as a searchable transaction on a blockchain with a signature of the content item added to the blockchain for recordkeeping. The search engine or other nodes of the mesh network may search the blockchain for hosted content (e.g. the video file) and may determine the user device that hosts the particular content of interest. The other nodes of the mesh network may initiate interaction with the user device, for example, through one or more intermediate nodes, to request access to the hosted video file.

In a variety of embodiments, a content item may be associated with a signature stored in the blockchain. A hash of the content associated with the content item may be generated and encrypted using a private key of the hosting node to form a signature stored in the blockchain. The signature may indicate a hosting node, a requesting node, and information (e.g., metadata) indicating the type of content and its version number. The search engine may store information related to the hosted content in a different manner, for example, by storing an indication of the type of content, version of the content, and the host node of the content item. Such information may be encrypted and may be obtainable to certain nodes (e.g. the search engine, or authorized nodes) in the mesh network.

In a variety of embodiments, the signature may be encrypted using cryptographic keys. Such cryptographic keys may be associated with nodes of the mesh network that host the content item. Corresponding cryptographic keys may be available to decrypt the encrypted signature. For example, the signature may be encrypted using the encryption key (e.g., public key) associated with the node conducting the transaction for content or hosting the content. The signatures may be decrypted using a key (e.g., private key) associated with the receiving node. The signature may also be encrypted and decrypted using a symmetric key.

At step 412, the search engine may query each content item posted in the mesh network based on the corresponding signature of the content item stored in the blockchain. The search engine may receive the encrypted signature and decrypt the encrypted signature using the corresponding decryption key. The search engine may query the blockchain to obtain the information related to the content item based on the signature in the blockchain. The signature may contain information indicating the hosting node of the content item. The search engine may retrieve the content item from the hosting node in the mesh network as indicated by the signature. For example, the search engine may query the blockchain based on the signature identifying the relevant content such as a video content related to the tropical island.

In a variety of embodiments, the search engine may provide a payment to the hosting node of the content item. The payment may be in the form of cryptocurrency stored in the cryptocurrency wallet of the search engine. For example, the search engine may be an authorized node in the mesh network, which may have the capability to authorize and issue the cryptocurrency wallet of the hosting node. For example, the hosting node may already have an issued cryptocurrency wallet with an initial amount of cryptocurrency tokens. The search engine may provide a payment to the hosting node by loading an extra amount of cryptocurrency tokens to its cryptocurrency wallet for delivering the content. The payment may be provided to the hosting node before or after the search engine may retrieve the content item from the hosting node. The transaction for content retrieval between the search engine and the hosting node may be stored as searchable transactions in the blockchain. The transfer of payment may also be recorded in the same blockchain. In some examples, the mesh network may be associated with a first blockchain to record the content retrieval transaction, and the mesh network may be associated with a second blockchain to record the payment information from the search engine to the hosting mode.

At step 414, the search engine may parse each content item to obtain a label and the content associated with each content item. The label may be provided by the content provider when the content was created and posted to the mesh network. Alternatively, the label may be generated by the search engine. In a variety of embodiments, the search engine may scan words, text, and/or metadata stored in, or associated with, a text file or a document, use natural language processing (NPL) or optical character recognition (OCR) to parse the document, and identify the keywords. The search engine may generate the label based on the key words. Such label may be used by the user attempting to find the content item and the search engine may use the label to match search criteria (e.g., key words or text specified by the user) to identify the content item. The search engine may analyze, for example, the HTML file associated with a website, and generate the label based on certain tags in the HTML file. For example, the search engine may analyze a header, title, or tags in the HTML file and generate a label. The search engine may analyze metadata associated with a video, an audio, an image or a multimedia file, and generate the label based on the metadata. For example, the search engine may analyze the metadata associated with the video and determine the video content may be related to the tropical island. The search engine may generate a label associated with the content item. The label may correspond to one or more word vectors that may include searchable text describing the content item. For example, word embeddings may be used for the representation of words for text analysis, typically in the form of a real-valued vector that may encode the meaning of the word such that the words that are closer in the vector space may be expected to be similar in meaning. The label may be generated based on the information in the signature or by parsing the content of the content item. In a variety of embodiments, the word vectors may be generated using a machine learning classifier. The search engine may use an autoencoder such as a variational autoencoder (VAE) to convert the documents. An autoencoder may be a type of artificial neural network used to learn efficient data encodings in an unsupervised manner. The autoencoder may learn a representation (e.g. encoding) for a set of data for the purpose of dimensionality reduction by training the network to ignore signal "noise". The autoencoder may have a reconstructing side, where the autoencoder may generate, from the reduced encoding, a representation as close as possible to its original input. The feature vectors may be a compact representation of the original data. The search engine may use language modeling and feature learning techniques in NLP where key words or phrases from the collection of the text may be mapped to vectors of real numbers. For example, for a text file or a document, the search engine may convert the document into a ten-dimensional vector of features, while maintaining the features of the original data sample. In another example, based on the metadata such as a description of the video file, the search engine may use the autoencoder to generate the feature vector and generate a label "tropical island video clips" corresponding to the content item based on the feature vector.

At step 416, the search engine may store the label, the signature, and the content associated with each content item in a database. The database may reside on a storage device local to the search engine. The database may be a distributed database shared with the search engine and other nodes in the mesh network. The database may also store the cryptocurrency wallet associated with the search engine. For example, the search engine may store a label "tropical island video clips," the signature identifying the content item and the content associated with the content item in the database.

At step 418, the search engine may query the blockchain to obtain a frequency that each content item has been queried in a predetermined period of time. In a variety of embodiments, each transfer of the content item from a first node (e.g., the hosting node) to a second node (e.g., an intermediate node or a requesting node) may generate a record or block on the blockchain comprising information related to the transfer. For example, the information may indicate the source node, destination node, content transferred, content version, etc. The search engine may search the blockchain for records, blocks, and/or information relating to hosted content that may be available. As an example, the search engine may review the blockchain to determine a hosting node that hosts the content item and all nodes that have requested the content item, and/or all nodes that have transferred the content between any two nodes. The search engine may determine which node stores the content item, which nodes may have cached copies of the content, and which nodes may have different versions of the original content item stored. In a variety of embodiments, the search engine may determine from a search of the blockchain a listing of nodes likely to be storing a cached copy of the content item.

The search engine may determine a frequency that a content item has been queried (e.g. requested, stored, cached, searched) in the predetermined period of time. Each search or request of the content item may generate a record or a block on the blockchain comprising information related to the search or request of the content. The search engine may search the blockchain for records, blocks, and/or information relating to such searches or queries based on the search terms or the labels. The search engine may count how many times a particular content item has been requested in a predetermined period of time based on the search terms or the labels. For example, the search engine may determine a frequency that the content item "tropical island video clips" has been queries in the last 24 hours.

At step 420, the search engine may rank the plurality of content items based on the frequencies. In a variety of embodiments, the search engine may organize the content items based on the frequencies. The search engine may rank the content items from the most frequently queried content items to the least frequently queried content items. The search engine may generate a list of content items based on the frequencies. The list may be updated dynamically with the passage of time. For example, the search engine may determine that the content item "tropical island video clips" is one of the top ranked content based on its frequency of queries in the last 24 hours.

At step 422, the search engine may determine, based on the ranking, a subset of the plurality of content items as frequently searched content. Depending on the number of the content items that have been posted in the mesh network, the search engine may stipulate, for example, a certain number (e.g. top 100,000) or a percentage (e.g. top 10%) of the content items as frequently searched content. For example, the search engine may determine that the content item "tropical island video clips" is frequently searched content based on its ranking.

At step 424, the search engine may distribute the frequently searched content to a plurality of cached nodes in the mesh network. The distribution of the frequently searched content to the cached nodes may be recorded as searchable transactions in the blockchain. For example, a new block may be added to the blockchain recording the distribution of a frequently searched item (e.g. the tropical island video clips) to a cached node. The block may include information related to the transfer of the content item from the search engine to the cached node. For example, the information may indicate the source node (e.g. the search engine), destination node (e.g. the cached node), content transferred, content version, etc. In the similar fashion, a plurality of blocks may be added to the blockchain as a result of the distribution of the frequently searched content to the corresponding cached nodes. The cached nodes may receive payments in the form of cryptocurrency tokens in exchange for the hosting of the content item. In a variety of embodiments, other nodes in the mesh network may obtain a copy of the frequently searched content and store it in the corresponding storage device associated with the node, and receive a payment in exchange of hosting the content item. The search engine may receive payments from requesting devices for promptly pointing to the cached nodes that may have a copy of the requested content item.

In a variety of embodiments, the search engine may determine certain content items are not frequently searched content. The search engine may determine the original hosting node of the content items. The search engine may not further distribute, store, and/or cache these content items to any cached node in the mesh network. In some examples, the search engine may determine that a last access time of a particular content item has exceeded an expiration time. The search engine may delete the particular content item from the plurality of cached nodes. For example, the search engine may determine that "tropical island video clips" have not been accessed for 48 hours and may delete the video content from the cached nodes after the expiration time of 48 hours.

Figure 5:
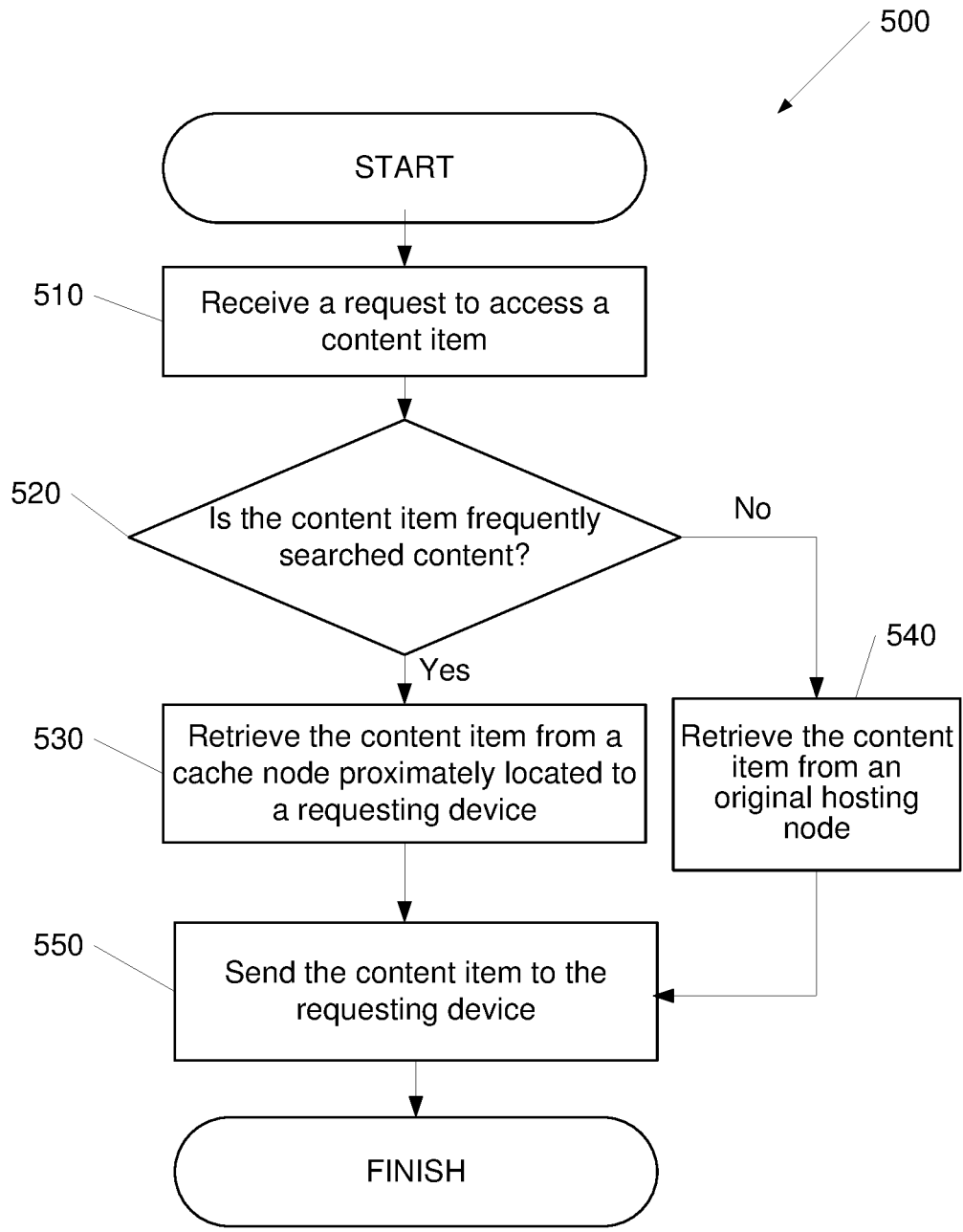
FIG. 5 shows a flow chart of a process for providing searched content according to one or more aspects of the disclosure.

FIG. 5 shows a flow chart of a process for providing searched content according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, a search engine may receive a request to access a content item. The requesting device may provide certain search terms or key words in the text format. The search engine may determine a label of the searched content item based on the search term or key words matching the searchable text in the word vectors of the label. The search engine may search a database associated with the search engine, and determine a signature identifying the searched content item based on the label.

At step 520, the search engine may determine whether the searched content item is a frequently searched content. If the answer is Yes, the process may proceed to step 530, where the search engine may retrieve the searched content item from a cached node that is proximately located to the requesting node. For example, the search engine may search the blockchain for hosting nodes that are positioned closer to the requesting nodes (e.g., by distance or geographical location). The hosting nodes may have the content (e.g., either a copy of the original content, an acceptable different version of the content, and/or a cached copy of the content). In this way, a requesting node may reduce a total cost and avoid payment to unnecessary intermediate nodes, if the content is located at a hosting node closer to the requesting node. In another example, the search engine may determine all the hosting nodes that have the content item. The search engine may determine a cost associated with each path to transfer the content item from the hosting node to the requesting node. The search engine may select a path that has the least cost to retrieve the content item via a least number of intermediate nodes.

In a variety of embodiments, the search engine may not retrieve the searched content from the cached node. Instead, the search engine may return the signature identifying the searched content and a path to a cached node that stores the searched content item, where the cached node is proximately located to the requesting device. If the answer in step 520 is No, the process may proceed to step 540, the search engine may query the blockchain to obtain the original hosting node based on the signature of the content item. The search engine may retrieve the searched content item from an original hosting node. At step 550, after the searched content item is retrieved either from a cached node or from an original node, the search engine may send the searched content item to the requesting device.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   determining, by a server system, a plurality of content items posted to a mesh network, wherein each content item is associated with a signature stored in a blockchain;
   querying each content item in the mesh network based on the corresponding signature in the blockchain;
   parsing each content item to obtain a label and content associated with each content item;
   storing the label, the signature, and the content associated with each content item in a database;
   querying the blockchain to obtain a frequency that each content item has been queried in a predetermined period of time;
   ranking the plurality of content items based on the frequencies;
   determining, based on the ranking, a subset of the plurality of content items as frequently searched content;
   distributing the frequently searched content to a plurality of cached nodes in the mesh network;
   receiving, from a computing device, a first request for a first content item;
   determining that the first content item is the frequently searched content;
   determining a total payment associated with a path to transfer the first content item from each cached node, of the plurality of cached nodes, to the computing device;
   determining, based on the total payment, a particular path that has a least cost to transfer the first content item, wherein the particular path is from one of the plurality of cached nodes to the computing device;
   retrieving, based on a first label associated with the first content item and the particular path, the first content item from one of the plurality of cached nodes that is proximately located to the computing device; and
   sending the retrieved first content item to the computing device.

2. The computer-implemented method of claim 1, further comprising:
   receiving, from the computing device, a second request for a second content item;
   determining that the second content item is not the frequently searched content;
   retrieving the second content item from an original hosting node in the mesh network; and
   sending the retrieved second content item to the computing device.

3. The computer-implemented method of claim 1, further comprising receiving, from the computing device, a payment associated with the first request for the first content item.

4. The computer-implemented method of claim 1, wherein the server system corresponds to a node in the mesh network that maintains the blockchain.

5. The computer-implemented method of claim 1, further comprising:
   storing a cryptocurrency wallet associated with the server system in the database.

6. The computer-implemented method of claim 1, further comprising:

determining a last access time of a particular content item has exceeded an expiration time; and deleting the particular content item from the plurality of cached nodes.

7. The computer-implemented method of claim 1, wherein the label corresponds to one or more word vectors comprising searchable text describing each content item.

8. The computer-implemented method of claim 1, wherein the database comprises a distributed database shared among the plurality of the cached nodes in the mesh network.

9. An apparatus, comprising:
one or more processors; and
memory storing instructions that, when executed by the one or more processors, cause the apparatus to:
determine a plurality of content items posted to a mesh network, wherein each content item is associated with a signature stored in a blockchain;
query each content item in the mesh network based on the corresponding signature in the blockchain;
parse each content item to obtain a label and content associated with each content item;
store the label, the signature and the content associated with each content item in a database;
query the blockchain to obtain a frequency that each content item has been queried in a predetermined period of time;
rank the plurality of content items based on the frequencies;
determine, based on the ranking, a subset of the plurality of content items as frequently searched content;
distribute the frequently searched content to a plurality of cached nodes in the mesh network;
receive, from a computing device, a first request for a first content item;
determining that the first content item is the frequently searched content;
determining a total payment associated with a path to transfer the first content item from each cached node, of the plurality of cached nodes, to the computing device;
determining, based on the total payment, a particular path that has a least cost to transfer the first content item, wherein the particular path is from one of the plurality of cached nodes to the computing device;
retrieve, based on a first label associated with the first content item and the particular path, the first content item from one of the plurality of cached nodes that is proximately located to the computing device; and
send the retrieved first content item to the computing device.

10. The apparatus of claim 9, wherein the instructions, when executed by the one or more processors, cause the apparatus to:
receive, from the computing device, a payment associated with the first request for the first content item.

11. The apparatus of claim 9, wherein the apparatus corresponds to a node in the mesh network that maintains the blockchain.

12. The apparatus of claim 9, wherein the instructions, when executed by the one or more processors, cause the apparatus to:
determine a last access time of a particular content item has exceeded an expiration time; and
delete the particular content item from the plurality of cached nodes.

13. The apparatus of claim 9, wherein the label corresponds to one or word vectors comprising searchable text describing each content item.

14. The apparatus of claim 9, wherein the database comprises a distributed database shared among the plurality of the cached nodes in the mesh network.

15. The apparatus of claim 9, wherein the instructions, when executed by the one or more processors, cause the apparatus to:
receiving, from the computing device, a second request for a second content item;
determining that the second content item is not the frequently searched content;
retrieving the second content item from an original hosting node in the mesh network; and
sending the retrieved second content item to the computing device.

16. A non-transitory machine-readable medium storing instructions that, when executed by one or more processors, cause the one or more processors to perform steps comprising:
determining, by a server system, a plurality of content items posted to a mesh network, wherein each content item is associated with a signature stored in a blockchain;
querying each content item in the mesh network based on the corresponding signature in the blockchain;
parsing each content item to obtain a label and content associated with each content item;
storing the label, the signature and the content associated with each content item in a database;
querying the blockchain to obtain a frequency that each content item has been queried in a predetermined period of time;
ranking the plurality of content items based on the frequencies;
determine, based on the ranking, a subset of the plurality of content items as frequently searched content;
distributing the frequently searched content to a plurality of cached nodes in the mesh network;
receiving, from a computing device, a first request for a first content item;
after determining that the first content item is the frequently searched content:
determining a total payment associated with a path to transfer the first content item from each cached node, of the plurality of cached nodes, to the computing device;
determining, based on the total payment, a particular path that has a least cost to transfer the first content item, wherein the particular path is from one of the plurality of cached nodes to the computing device; and
retrieving, based on a first label associated with the first content item, the first content item from the one of the plurality of cached nodes that is proximately located to the computing device;
after determining that the first content item is not the frequently searched content:
retrieving the first content item from an original hosting node in the mesh network; and
sending the retrieved first content item to the computing device.

17. The non-transitory machine-readable medium of claim 16, wherein the instructions, when executed by the one or more processors, cause the one or more processors to perform steps comprising:

receiving, from the computing device, a payment associated with the first request for the first content item.

18. The non-transitory machine-readable medium of claim 16, wherein the instructions, when executed by the one or more processors, cause the one or more processors to perform steps comprising:
- determining a last access time of a particular content item has exceeded an expiration time; and
- deleting the particular content item from the plurality of cached nodes.

19. The non-transitory machine-readable medium of claim 16, wherein the label corresponds to one or word vectors comprising searchable text describing each content item.

20. The non-transitory machine-readable medium of claim 16, wherein the database comprises a distributed database shared among the plurality of the cached nodes in the mesh network.

\* \* \* \* \*